(12) United States Patent
Hess et al.

(10) Patent No.: US 10,900,767 B2
(45) Date of Patent: Jan. 26, 2021

(54) DETECTION DEVICE AND LUBRICANT DISTRIBUTOR

(71) Applicant: SKF Lubrication Systems Germany GmbH, Walldorf (DE)

(72) Inventors: Dieter Hess, Ludwigshafen (DE); Juergen Kreutzkaemper, Waibstadt-Daisbach (DE); Tobias Mueller, Kraichtal (DE); Jan Ruiter, Schwetzingen (FR); Andreas Schoenfeld, Sankt Leon-Rot (DE); Schuemann Stefan, Walldorf (DE)

(73) Assignee: SKF Lubrication Systems Germany GmbH, Walldorf (DE)

( * ) Notice: Subject to any disclaimer, the term of this patent is extended or adjusted under 35 U.S.C. 154(b) by 432 days.

(21) Appl. No.: 15/825,868

(22) Filed: Nov. 29, 2017

(65) Prior Publication Data

US 2018/0149461 A1    May 31, 2018

(30) Foreign Application Priority Data

Nov. 30, 2016 (DE) .................. 10 2016 223 802

(51) Int. Cl.
*G01B 7/14* (2006.01)
*G01B 7/00* (2006.01)
(Continued)

(52) U.S. Cl.
CPC ............ *G01B 7/14* (2013.01); *F16N 13/02* (2013.01); *F16N 25/02* (2013.01); *G01B 7/003* (2013.01); *G01B 11/14* (2013.01); *F16N 2250/00* (2013.01)

(58) Field of Classification Search
CPC ......... G01B 7/14; G01B 7/003; G01B 11/14; F16N 13/02; F16N 25/02; F16N 2250/00
See application file for complete search history.

(56) References Cited

U.S. PATENT DOCUMENTS 2,221,724 A * 11/1940 Safford .................. F16K 17/082
    137/469
3,220,375 A * 11/1965 Gruber .................... F16N 29/00
    116/204

(Continued)

FOREIGN PATENT DOCUMENTS

CN          1211699 A       3/1999
CN        201875419 U       6/2011
(Continued)

OTHER PUBLICATIONS

Office Action and Search Report from the Chinese Patent Office dispatched Jun. 22, 2020 in related Chinese application No. 201711159254.8, and translation thereof.

(Continued)

*Primary Examiner* — Michael A Riegelman
(74) *Attorney, Agent, or Firm* — J-Tek Law PLLC; Scott T. Wakeman; Mark A. Ussai

(57) ABSTRACT

A device for detecting a movement of a piston of a lubricant distributor includes a movable actuator including a first magnet element, and a movable indicator including a second magnet element. The actuator is configured to be moved from an initial actuator position to an end actuator position by a movement of the piston, and the actuator and the indicator are configured and disposed such that a repulsive magnetic force prevails between them such that the indicator is moved from an initial indicator position to an end indicator position by the movement of the actuator from the initial actuator position toward the end actuator position.

17 Claims, 7 Drawing Sheets

(51) Int. Cl.
*F16N 25/02* (2006.01)
*F16N 13/02* (2006.01)
*G01B 11/14* (2006.01)

(56) References Cited

U.S. PATENT DOCUMENTS

| | | | | |
|---|---|---|---|---|
| 3,364,897 | A * | 1/1968 | Mouwen | B01D 35/143 |
| | | | | 165/80.3 |
| 3,371,787 | A * | 3/1968 | Kudlaty | B01D 35/147 |
| | | | | 210/90 |
| 3,472,275 | A * | 10/1969 | Keithahn | G05D 7/0126 |
| | | | | 137/551 |
| 3,626,474 | A * | 12/1971 | Hammer | B01D 35/143 |
| | | | | 137/554 |
| 3,633,612 | A * | 1/1972 | Gross | F16K 17/22 |
| | | | | 137/498 |
| 3,651,827 | A * | 3/1972 | Hammer | B01D 35/143 |
| | | | | 137/469 |
| 5,333,642 | A * | 8/1994 | Kemp | F16K 37/0033 |
| | | | | 137/554 |
| 10,591,082 | B2 * | 3/2020 | Marco | F16K 31/084 |
| 2005/0258004 | A1 * | 11/2005 | Paluncic | F16N 11/08 |
| | | | | 184/7.4 |
| 2006/0213725 | A1 | 9/2006 | Czempisz et al. | |
| 2018/0119879 | A1 * | 5/2018 | Hess | F16N 25/02 |
| 2018/0149461 | A1 * | 5/2018 | Hess | G01B 7/14 |
| 2019/0242495 | A1 * | 8/2019 | Wada | H01H 35/38 |

FOREIGN PATENT DOCUMENTS

| | | |
|---|---|---|
| CN | 202158334 U | 3/2012 |
| CN | 103574266 A | 2/2014 |
| CN | 204439096 U | 7/2015 |
| CN | 105387328 A | 3/2016 |
| DE | 4328415 C1 | 4/1995 |
| FR | 2441833 A1 | 6/1980 |

OTHER PUBLICATIONS

Office Action and Search Report from the Chinese Patent Office dispatched Jun. 24, 2020 in related Chinese application No. 201711089455.5, and translation thereof.

Office Action from the United States Patent Office dated Jun. 2, 2020 in related U.S. Appl. No. 15/825,539.

* cited by examiner

DETECTION DEVICE AND LUBRICANT DISTRIBUTOR

CROSS-REFERENCE

This application claims priority to German patent application no. 10 2016 223 802.7 filed on Nov. 30, 2016, the contents of which are fully incorporated herein by reference.

TECHNOLOGICAL FIELD

The disclosure relates to a detection device for a piston movement of a lubricant distributor and a corresponding lubricant distributor.

BACKGROUND

Lubricant distributors as such are sufficiently known. The serve to dispense a lubricant to one or more lubrication points in a metered manner They are often embodied in block construction and are designed for dispensing various metering volumes. At its two end sides each lubricant distributor can respectively include, for example, one or two threaded bores for the selective connecting of one or two main lines of a central lubrication system. The lubricant distributor may include, for example, eight threaded bores for connecting the lines to the lubrication points. The lubricant metering itself is effected by a metering piston that is movably disposed in a cylinder bore in the lubricant distributor housing. A defined amount of lubricant is dispensed with each stroke of the metering piston. A control piston is usually provided for controlling the metering piston. The control piston opens and closes the main lines. Depending on the pressure applied, the control piston moves in the one or the other direction, whereby as a result the metering piston also moves and dispenses a corresponding amount of lubricant.

In addition to single-line or two-line distributors the above description applies analogously also in the case of other distributors, for example, in the case of a progressive distributor in which a plurality of pistons correspondingly dispense lubricant to a plurality of lubrication points.

For proper operation it can be necessary to monitor the movement of the metering piston and/or of the control piston, i.e., to determine whether the metering piston performs its intended metering stroke. Numerous measures are already known for this purpose, which, however, are generally technically complex and therefore expensive. On the other hand, a comparatively simple device for monitoring the movement of the metering piston comprises a sleeve connected end-side to a bore, in which sleeve a pin is held. The pin is connected to the metering piston and thus follows its movement. The length of the pin is chosen such that it protrudes from the sleeve in an externally visible manner and thus makes the position of the piston externally visible. Since a high pressures of several hundreds of bar can prevail in the interior of the lubricant distributor, a seal is required between the sleeve and the pin. Here there are high requirements on the tightness of the seal. However, with wear inevitably occurring due to the movement of the pin, starting from a certain period of use the tightness can no longer be reliably ensured. In addition, a control pin has negative effects on the internal pressure balance and the displaced stroke volume, which often results in an imprecise lubricant allocation.

In FIG. 1 a lubricant distributor 1 in the form of a so-called single-line distributor of a known design is depicted. The lubricant distributor 1 is provided with an indicator unit 3 according to the prior art. The lubricant distributor 1 comprises a housing 5 in which a cylinder bore 7 is provided. A metering piston 9 is disposed in a horizontally movable manner inside the cylinder bore 7. End-side the cylinder bore 7 comprises expanding bores 11 and 11' that each include an internal thread. The bore 11 is closed by a closure piece 13 that is screwed into the internal thread. In the exemplary embodiment depicted here two lubricant outlets 15 and 15' are provided in the housing that are respectively connected to the cylinder bore 7 via a lubricant channel 17 or 17'. The cylinder bore 7 also includes a lubricant inlet 19 via which lubricant is suppliable in the form of oil or grease. For this purpose the lubricant distributor 1 is connected via lines to a lubricant reservoir, and also includes a control piston that is not depicted here. The metering piston 9 includes two constrictions 21 and 21', through which lubricant can be received into the correspondingly configured cavities 23 and 23' with corresponding horizontal position of the metering piston 9 in front of the lubricant inlet 19. In the position shown in FIG. 1 lubricant is received in the cavity 23' formed by the constriction 21' At the same time, lubricant located in the cavity 23 is pumped in the lubricant channel 17 to the lubricant outlet 15 and dispensed to a consumer via a not-depicted connecting line. With a subsequent movement of the metering piston 9 to the right the cavity 23 comes into contact with the lubricant inlet 19, whereby it is filled with lubricant again. At the same time the cavity 23' lies on the lubricant channel 17', so that the lubricant located in it is correspondingly dispensed to a consumer. This mode of operation is well known.

The indicator unit 3 is screwed into the bore 11', which indicator unit 3 comprises a housing including a corresponding internal thread 33. The housing 31 is divided into two sections by a separating wall 35. The section depicted here on the left includes a hollow space 36, in which the metering piston 9 is received when moving rightward. The indicator unit 3 also includes a pin 37 that is screwed-in into the metering piston 9 end-side with a thread 39. On the opposite end 41 the pin 37 projects out of the housing 31 so that its axial position is externally visible. The separating wall 35 correspondingly includes an opening through which the pin 37 projects. In order to prevent an escape of lubricant, the section of the housing 31 depicted on the right includes a seal unit 43 that is retained in the housing 31 and sealingly surrounds the pin 37.

Due to the comparatively simply buildable construction the current position of the metering piston can be very easily determined externally. However, in many applications for a vast majority of the time the metering piston 9 is in the initial position depicted in FIG. 1. It only moves right and left with the initiating of a lubricating process in order to dispense lubricant to both lubricant outlets 15 and 15'. This process only lasts a few seconds, after which often for a plurality of minutes up to a plurality of hours no more lubricating and thus no movement of the metering piston 9 takes place. In order to determine the effortless function of the lubricant distributor 1 the pin 37 must consequently be continuously monitored in order not to miss the movement.

SUMMARY

It is therefore an aspect of the present disclosure to specify a detection device for the piston of a lubricant distributor, which detection device is simply and robustly embodied and is thus not prone to wear. It is a further aspect of the disclosure to specify a corresponding lubricant distributor.

This is achieved by a preferred embodiment of the disclosure. Accordingly a detection device is specified having the following features:

a movable actuation element including a magnet device,
a movable magnet element,
wherein the actuation element is configured such that it is displaceable from an initial position into an end position by a movement of the piston toward the actuation element,
wherein the magnet device and the magnet element are configured and disposed such that a repulsive magnetic force prevails between them, due to which the magnet element is movable from an initial position up to an end position in the event of a moving of the actuation element from the initial position toward the end position.

The disclosure is essentially based on the recognition that with a plurality of lubricant distributors or pistons of a delivery pump a continuous monitoring, for example, by complex electronic detectors, is not required. Rather, it is sufficient if it is checked at regular intervals whether at least one lubricating process has taken place since the last monitoring. This can be effected, for example, by a maintenance technician or service personnel, who subjects the lubricant distributor to a visual inspection, for example, every 15-30 minutes. It is definitely the case that several hours can elapse between two individual lubricating processes and the movements associated therewith of the piston. This is in particular the case with the use of lubricating grease. However, the lubricating process itself and thus the movement of the piston lasts only a few seconds. It would therefore be pure coincidence if a maintenance technician could directly observe the actual lubricating process during the visual inspection. Simple devices for visualizing the piston movement, such as the above-described pin, prove disadvantageous here, since they follow the piston movement and thus return into their initial position after the lubricating process. In the next visual inspection it is not discernible by the maintenance technician whether one or more lubricating processes have taken place since the last visual inspection.

This is reliably made possible by the disclosure. As soon as the piston sets into motion during a lubricating process, the actuation element is displaced toward its end position. Here the magnet device displaces the magnet element toward the retaining position due to the acting magnetic force. However, with a return movement of the piston at least the magnet element remains in its end position, whereby the lubricating process having taken place is indicated by the position of the magnet element even after its ending. Even with a not-necessarily permanent coupling of the actuation element to the metering piston the magnet element would remain in its end position, since the displacing takes place due to a repulsive magnetic force, i.e., with a return movement of the actuation element into its initial position the magnet element is not carried along.

Due to the magnet element located in the retaining element the maintenance technician can easily establish in the next visual inspection that at least one lubricating process has taken place, and the lubricant distributor is thus functional. Due to the indirect relaying of the piston movement for moving the magnet element by magnetic forces, the movable parts can be separated from one another in a structurally simple manner, with the result that no dynamic seals susceptible to wear are required. Thus the actuating element can be located inside a housing of the detection device, while the magnet element is movably held outside the housing. Both elements are then separated by a housing wall. The housing can also be constructed multi-stage, so that the magnet device and the magnet element are located in different cavities. It is only to be ensured that the magnetic forces are not unduly shielded or impaired.

In one preferred embodiment of the disclosure the detection device includes a retaining element that is configured such that a retaining force is exertable on the magnet element located in the retaining position. It is ensured by the retaining force that even with the occurring of vibrations or shocks the magnet element does not unintentionally return into the initial position and thus a false negative indication occurs during the visual inspection. The detection device thus operates extremely reliably.

In one preferred embodiment of the disclosure the actuation element is configured such that it is only at times in operative engagement with the piston. It is not required for (but not detrimental to) for the functioning of the disclosure that the actuation element be permanently in operative engagement with the piston. A continuous tracking of the piston movement is not performed. It is thus sufficient, for example, if in the visual inspection the maintenance technician returns the actuation element and the magnet element into the initial or base position, so that starting from this point in time the next lubricating process can be indicated again.

In one preferred exemplary embodiment of the disclosure the actuation element includes a pin element, which in the installed state is disposed on the actuation element pointing toward the piston, and its length is chosen such that a force displacing the pin element is only exertable on the pin element by the piston in an end range of its movement. This translates in a constructively simple manner to the piston only at times being in operative engagement with the pin element and the actuation element. During movement the piston presses against the pin element and thus displaces the actuation element. However, with the reverse movement the piston simply pulls away from the actuation element without moving it back with it. In principle, provided with a corresponding thread the pin could also be screwed into a counter-thread in the piston and thus sequentially perform the movement of the piston without leaving the scope of the inventive principle. However, there is no need for such constructive measures. In addition, such a detection device can also be retrofitted in a simple manner to already existing lubricant distributors, since the piston need not include any special features. The length of the pin element can be selected or adapted according to the range of movement of the piston. For the connection the connection device can include on a housing an external thread, for example, via which it is screwed into a corresponding internal thread on the end of the piston bore. If necessary an additional adapter sleeve can also be used that includes an external thread adapted to the internal thread, and an internal thread adapted to the external thread of the detection device.

In one preferred embodiment of the disclosure the detection device includes the further following features:
the magnet device of the actuating element is embodied as a cylindrical permanent magnet,
the magnet element is embodied as an annular permanent magnet,
the magnet device and the magnet element are disposed such that with the magnet device disposed in the initial position and the magnet element disposed in the initial position, no magnetic force acts between them,
the magnet device and the magnet element are oriented such that with a movement of the actuation element from the actuation element toward the end position a repulsive magnetic force is exertable by the magnet device onto the magnet element.

The term "no magnetic force" is to be understood to mean that the prevailing magnetic force is small enough that the magnet element is not displaced thereby with the specified relative positioning of magnet device and magnet element. This can be effected, for example, via an axial spacing. This design can be manufactured in a manner that is particularly constructively simple and extremely resistant to wear. The magnetic forces effect a reliable visualization of the piston movement, whereby it is ensured that the magnet element is not moved without a movement of the piston toward the retaining element. This would otherwise represent an error detection and not reliably signal the operability of the lubricant distributor.

In one preferred embodiment of the disclosure the retaining element is at least partially comprised of a magnetizable material. It is thereby ensured in a simple manner that with the magnet element located in the initial position no attractive force effect occurs between the magnet element and the retaining element. When the permanently magnetized magnet element approaches the retaining position the retaining element is thereby magnetized so that the retaining force arises. As soon as the magnet element is moved away from the retaining position, the magnetization of the retaining element is lost and the retaining force disappears. The retaining element is correspondingly made of a magnetically "soft" material. Alternatively the retaining element can also be comprised of a permanent magnet that is oriented according to the magnet element and basically exerts an attractive force. However, the strength of the permanent magnets or the distance of the initial position of the magnet element from the retaining element is to be chosen such that in this position such a small magnetic force acts that the magnet element is not moved away from the initial position.

In one preferred embodiment of the disclosure the detection device includes a resetting element, using which the magnet element is bringable from the retaining position into the initial position upon overcoming the retaining force. Thus after successful visual inspection of the magnet element a maintenance technician can simply push the magnet element back into the initial position, so that the next lubricating process can be detected.

In one preferred embodiment of the disclosure the retaining element is embodied as a spring element, which is disposed between a housing of the detection device and the resetting element. This has the advantage that the resetting element is bringable into its initial position by the spring element.

In one preferred embodiment of the disclosure the resetting element is configured as a movable cap element that covers the magnet element and is embodied transparent in the region of the magnet element. The cap element allows a simple visual inspection due to the transparent embodiment. It also offers protection for the magnet element.

Furthermore, in one embodiment of the disclosure a force element is provided, using which the actuation element is bringable from the end position into the initial position. The force element is preferably embodied as a spring element that moves the actuation element, but not the magnet element, back into the initial position when the piston moves back. A manual returning of the actuation element is thus omitted.

An aspect also includes a lubricant distributor including a housing block and at least one piston guided in a piston bore, comprising at least one detection device according to the disclosure. With such a lubricant distributor the lubricating processes can be controlled in a simple and reliable manner Here the lubricant distributor can be configured, for example, as a single-line distributor, two-line distributor, throttle distributor or quantity limiter, delivery piston of a pump element, or as a progressive distributor.

The lubricant distributor is configured for the delivery of lubricant to at least one lubrication point, wherein the lubricant distributor includes a housing block wherein at least one piston is disposed movable back and forth in at least one cylinder bore, wherein a detector unit is available using which the position of the piston in a piston position can be recorded, wherein the detector unit is disposed on the housing block such that the piston can enter into operative connection with the actuation element if it is located in the cylinder bore near one of its end positions.

Further advantages, features, and details of the disclosure arise from the exemplary embodiments of the disclosure described below with reference to the Figures.

DETAILED DESCRIPTION

Figure 2:
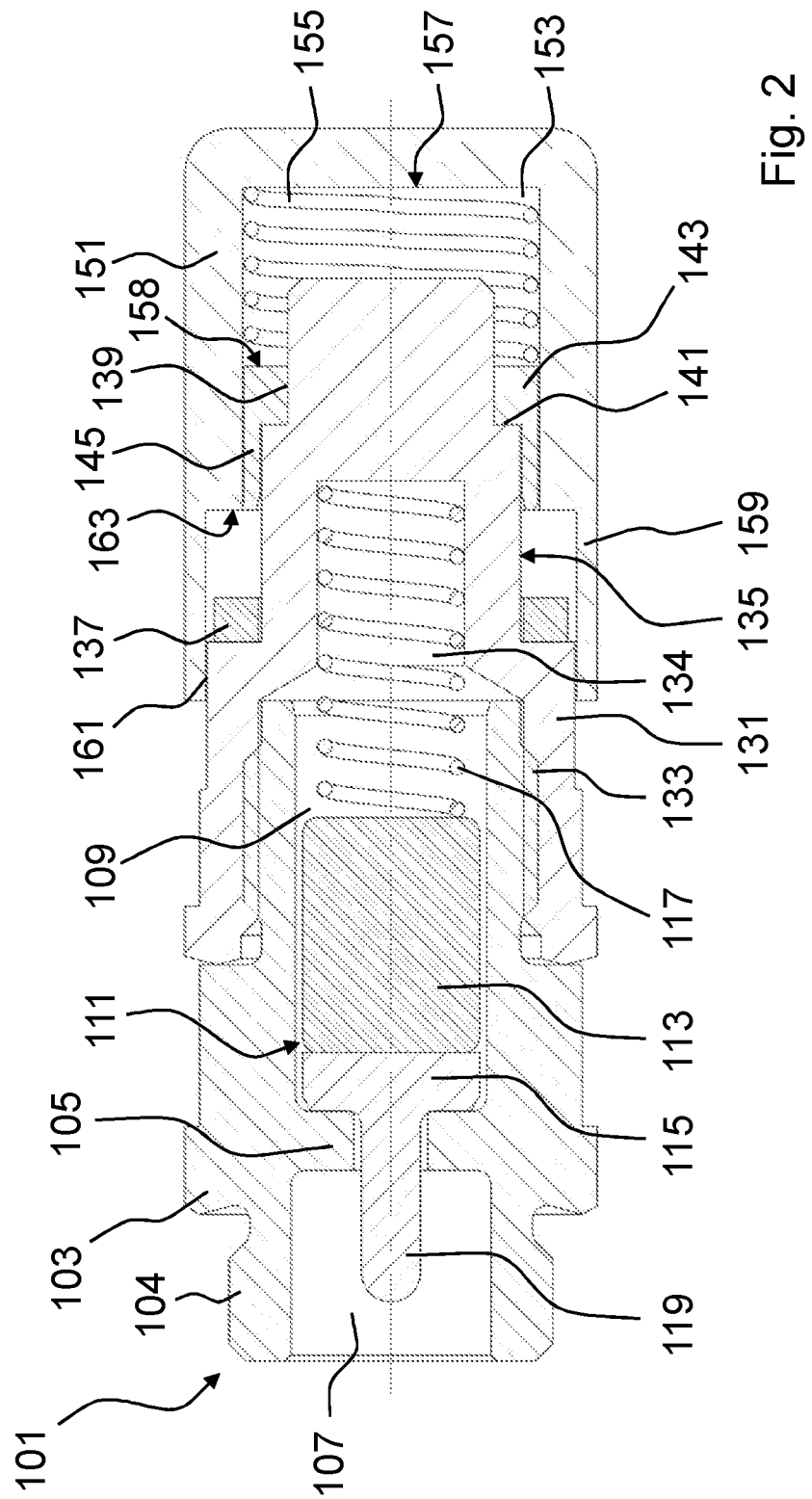
FIG. 2 is a detection device according to a preferred embodiment of the disclosure.

In FIG. 2 a detector 101 according to an embodiment of the disclosure is depicted. It can be used, for example, as a replacement for the indicator unit 3 in the lubricant distributor 1. The mode of operation is superior in comparison to the indicator unit 3. The detector 101 includes a housing part 103 that is provided with an external thread 104. Using this the detector 101 can be inserted into one of the bores 11 or 11'. The housing part 103 also includes a separating wall 105 that includes an opening in an analogous manner to that of the indicator unit 3 and separates the housing part 103 into two sections. The left section includes a hollow space 107 in which the metering piston 9 is received during movement to the right. A hollow space 109 is formed in the right section. In the hollow space 109 a transfer unit 111 is disposed that comprises a cylindrical permanent magnet 113 that is connected to a pin unit 115. The transfer unit 111 is axially movable in the hollow space 109, but is impinged with a force by a spring 117 and pressed against the separating wall 105. The pin unit 115 includes a pin 119 that extends through the opening in the separating wall 105 into the hollow space 107.

The detector 101 includes a second housing part 131 that is connected to the housing part 103 via a screw connection 133. Here numerous other connection types are conceivable, such as, for example, an adhesive connection or a tight press-fit. The housing part 131 includes a hollow space 134 that enlarges the hollow space 109 and partially receives the spring 117. Its inner diameter corresponds to the outer diameter of the spring 117 or is chosen slightly larger. The housing part 131 includes a radially outer-lying raceway 135 on which an axially displaceable magnet ring 137 is supported. The magnet ring 137 is comprised of a permanent magnet whose axial orientation is chosen with respect to the permanent magnets 113 such that a repulsive magnetic force basically prevails between the two. In the position shown in FIG. 2 of permanent magnet 113 and magnet ring 137, which corresponds to a initial position of the detector 101, the axial spacing between permanent magnet 113 and magnet ring 137 is chosen so large that the repulsive magnetic force is in turn so small that the magnet ring 137 is not axially displaced. In this position the magnetic force cannot overcome the frictional force acting between the raceway 135 and the magnet ring 137, i.e., it is smaller than this. The magnetic field strengths of permanent magnet 113 and magnet ring 137 are correspondingly matched to each other.

The housing part 131 also includes a seat surface 139 that forms an annular step 141 with the extension of the raceway 135. A retaining unit 143 is held on the seat surface 139, for example, by a screw connection, an adhesion-promoting adhesive layer, or a press-fit. The retaining unit 143 includes a section 145 extending toward the raceway 135, which ends at the end of the raceway 135. The retaining unit 143 is comprised of a magnetically soft material (e.g. 9SMn28k or 16MnCr5), i.e., is magnetizable by the proximity of a permanent magnet. Then an attractive magnetic force arises between the retaining unit and the permanent magnet of the magnet ring 137. With removal of the permanent magnets the magnetization is lost again in a short time so that the attractive magnetic force is lost again.

The detector 101 includes a cap 151 that forms a hollow space 153 and is axially displaceably retained on the retaining unit 143, for example by a loose press-fit. In the hollow space 153 a spring 155 is presses against an end-inner side 157 of the cap 151 and opposite against an end side 158 of the retaining unit 143. In the axial position depicted in FIG. 2 of the cap 151 the spring 155 is relaxed, with the result that no force is exerted. On the end of the cap 151 axially opposing the end-inner side 157 the cap 151 includes a section 159 that covers the raceway 135, the magnet ring 137, and partially a partially corresponding section 161 of the housing part 131. At least in the region of the section 159 the cap 151 is transparently embodied, with the result that the position of the magnet ring 137 is externally visible. In the region of the section 159 the wall thickness of the cap 151 is thinner than on the remaining cap 151, with the result that a shoulder 163 is formed. The shoulder 163 extends far enough radially inward that it radially overlaps the magnet ring 137.

In the following FIGS. 3 and 4 the detector 101 is described in various installation situations, while the operation is explained in detail with reference to FIGS. 5 and 6.

Figure 3:
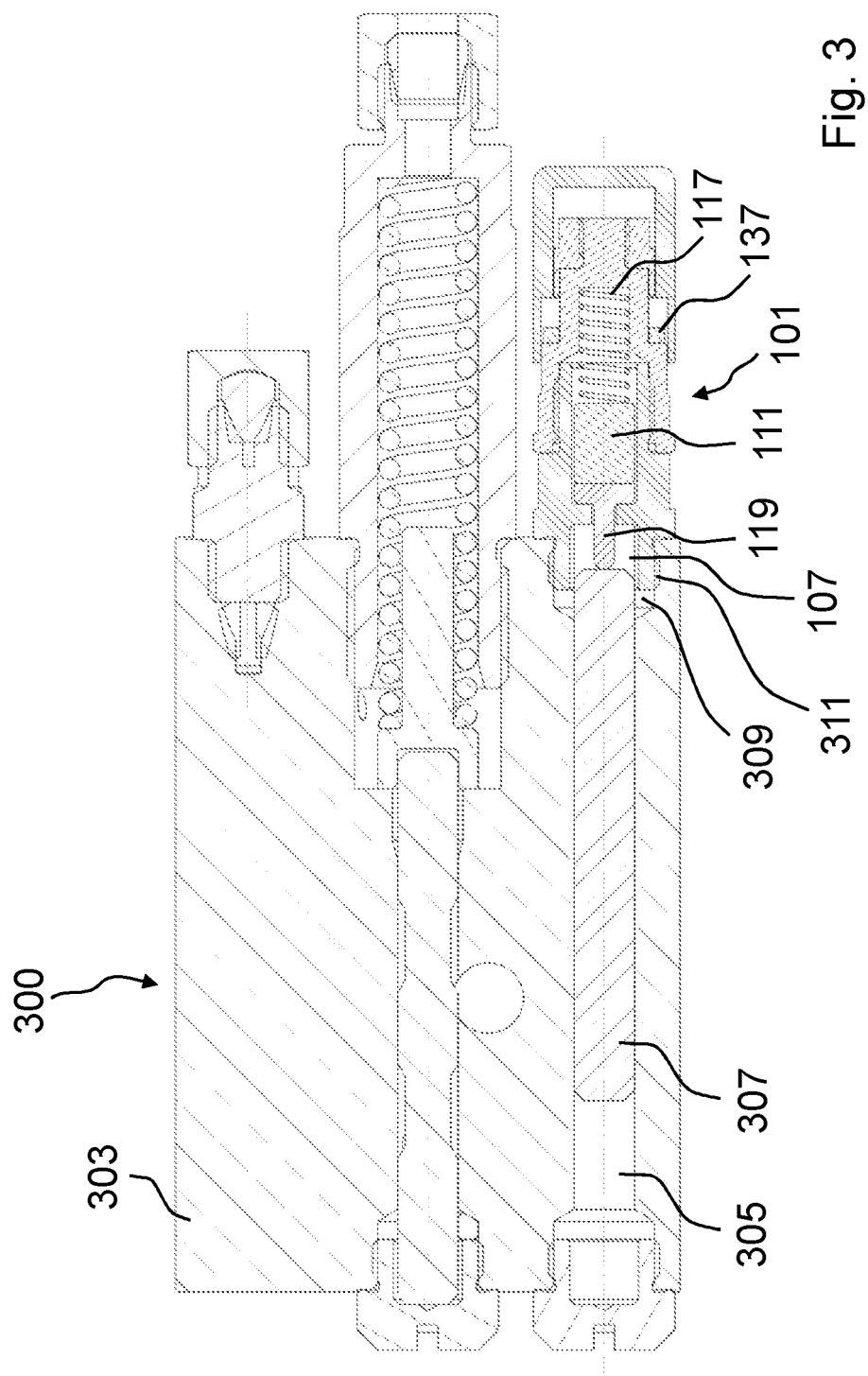
FIG. 3 is a single-line distributor including a detection device according to FIG. 2.

In FIG. 3 a lubricant distributor 300 is sectionally depicted. It comprises in particular a housing 303 including at least one cylindrical bore 305. A metering piston 307 is movably disposed in the cylindrical bore 305. The remaining constructive features depicted here of the lubricant distributor 301, which is embodied here as a single-line distributor, are well known from the prior art and are therefore not further discussed here. Lubricant is delivered to lubricant outlets not depicted here by a movement of the metering piston 307. At the right end, depicted in FIG. 3, of the cylindrical bore 305 an expanded bore 309 is formed that includes an internal thread 311. A detector 101 is screwed into the internal thread 311, which corresponds in its embodiment to that of the detector 101 depicted in FIG. 2. The detector 101 is depicted here in its base state with respect to the position of the transfer unit 111 and the ring magnet 137. Some constructive details are not depicted here. The metering piston 307 is located in the middle of a lubrication cycle and moves here toward the pin 119 of the detector 101. Here it penetrates into the hollow space 107 and begins to press against the pin 119. When the metering piston 307 moves farther to the right, the pin 119 and thus the entire transfer unit 111 is pressed to the right, whereby the spring 117 is pressed together. The force necessary for this purpose is applied by the movement of the metering piston. With increasing advancement of the transfer unit 111 an axial displacing of the ring magnet 137 results between the permanent magnet 113 and the ring magnet 137 due to the prevailing repulsive magnetic force. The effects on the function of the detector 101 are discussed in more detail with reference to FIGS. 5 and 6.

Figure 4:
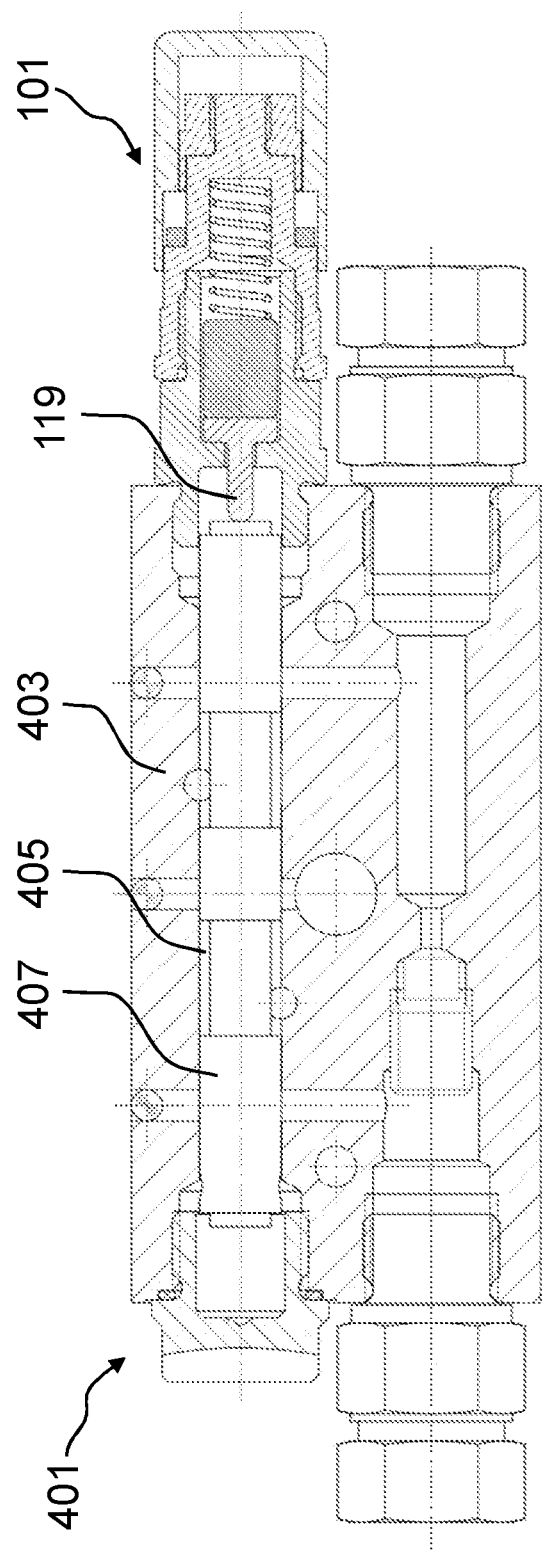
FIG. 4 is a progressive distributor including a detection device according to FIG. 2.

A lubricant distributor 401 is sectionally and schematically depicted in FIG. 4. In this case it is a so-called progressive distributor. Also in the description of FIG. 4 only the constructive features essential to the disclosure are described, while known constructive features are not explained in more detail. These can be inferred from the numerous available examples of prior art for progressive distributors. The lubricant distributor 401 comprises in particular a housing 403 wherein a cylindrical bore 405 is formed. A metering piston 407 is movably disposed in the bore 405. Comparable to the lubricant distributor 301 depicted in FIG. 3, a detector 101 according to the exemplary embodiment of FIG. 2 is also located here at the end of the bore. The lubricant distributor 401 and thus also the metering piston 407 are also located here in a lubrication cycle at the point in time wherein the metering piston 407 comes into contact with the pin 119 with movement rightward.

Figure 5:
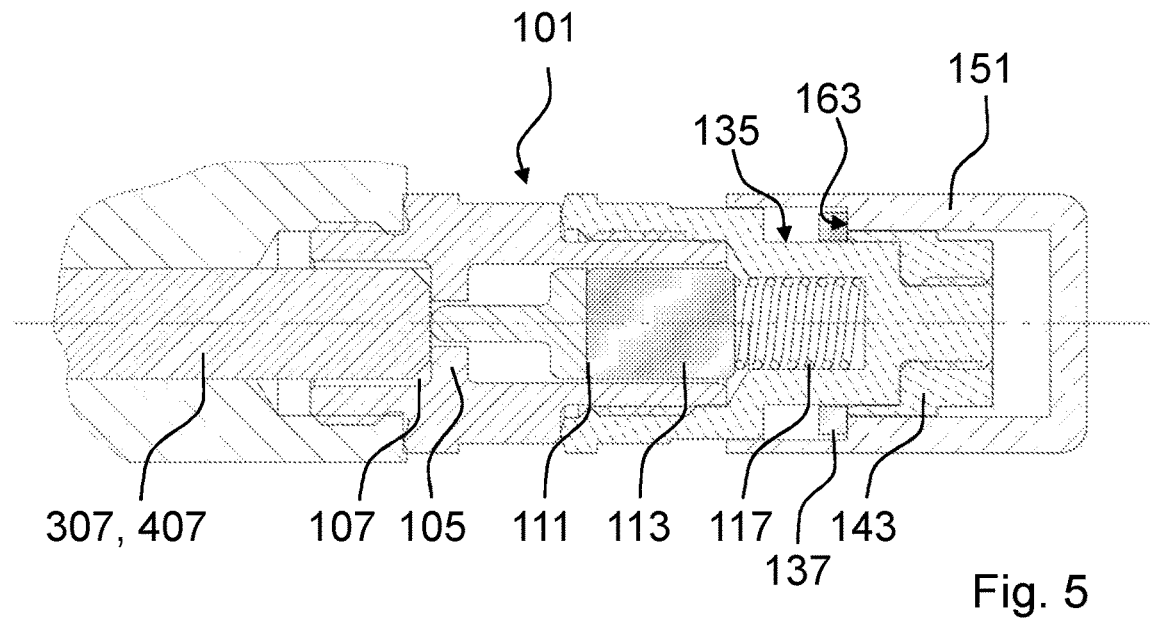
FIGS. 5 and 6 show the detection device according to FIG. 2 in various operating states.

In FIG. 5 the operating state is sectionally depicted wherein the metering piston 307 or 407 has arrived at its maximum deflection at the right end of its movement cycle. In this case it fills nearly completely the hollow space 107 of the detector 101 and abuts on the separating wall 105. The transfer unit 111 is thereby also maximally displaced rightward and the spring 117 maximally compressed. Due to the repulsive magnetic field force between permanent magnet 113 and ring magnet 137 the ring magnet 137 is correspondingly displaced rightward up to the end of the raceway 135 and thus abuts on the retaining unit 143 and on the shoulder 163 of the cap 151. Due to the proximity of the ring magnet 137 a magnetization of the retaining unit 143 arises, with the result that this in turn exerts an attractive magnetic force on the ring magnets 137. In the following during the course of the lubrication cycle a rearward-directed movement of the metering piston 307 or 407 arises, which is depicted in detail in FIG. 6.

Figure 6:
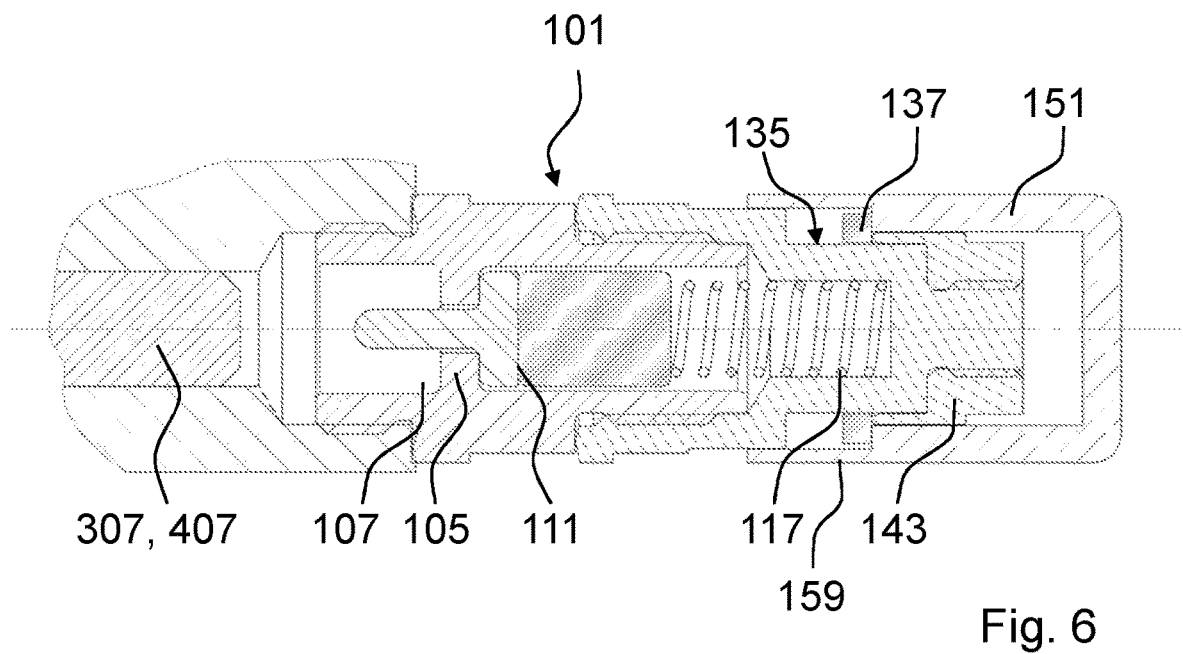

In FIG. 6 the metering piston 307 or 407 has moved the left again in the context of its lubrication cycle and is thus completely withdrawn from the hollow space 107. Due to the previously tensioned spring 117 a force arises acting in the same direction on the transfer unit 111, which has thus been moved back into its initial position and abuts on the separating wall 105. On the other hand, the ring magnet 137 is also located on the right-side edge of the raceway 135, since no force acts on it that effects a leftward displacement. In addition the ring magnet 137 is retained at its shown position due to the attractive force of the retaining unit 143. The position change of the ring magnet 137 can be observed externally in a simple manner through the transparent cap 151 in section 159. In this respect, for example, it can be determined by a maintenance technician during a routine visual inspection of the lubricant distributor whether at least one lubricating cycle has taken place since the last visual inspection; the lubricant distributor is therefore functional.

Figure 1:
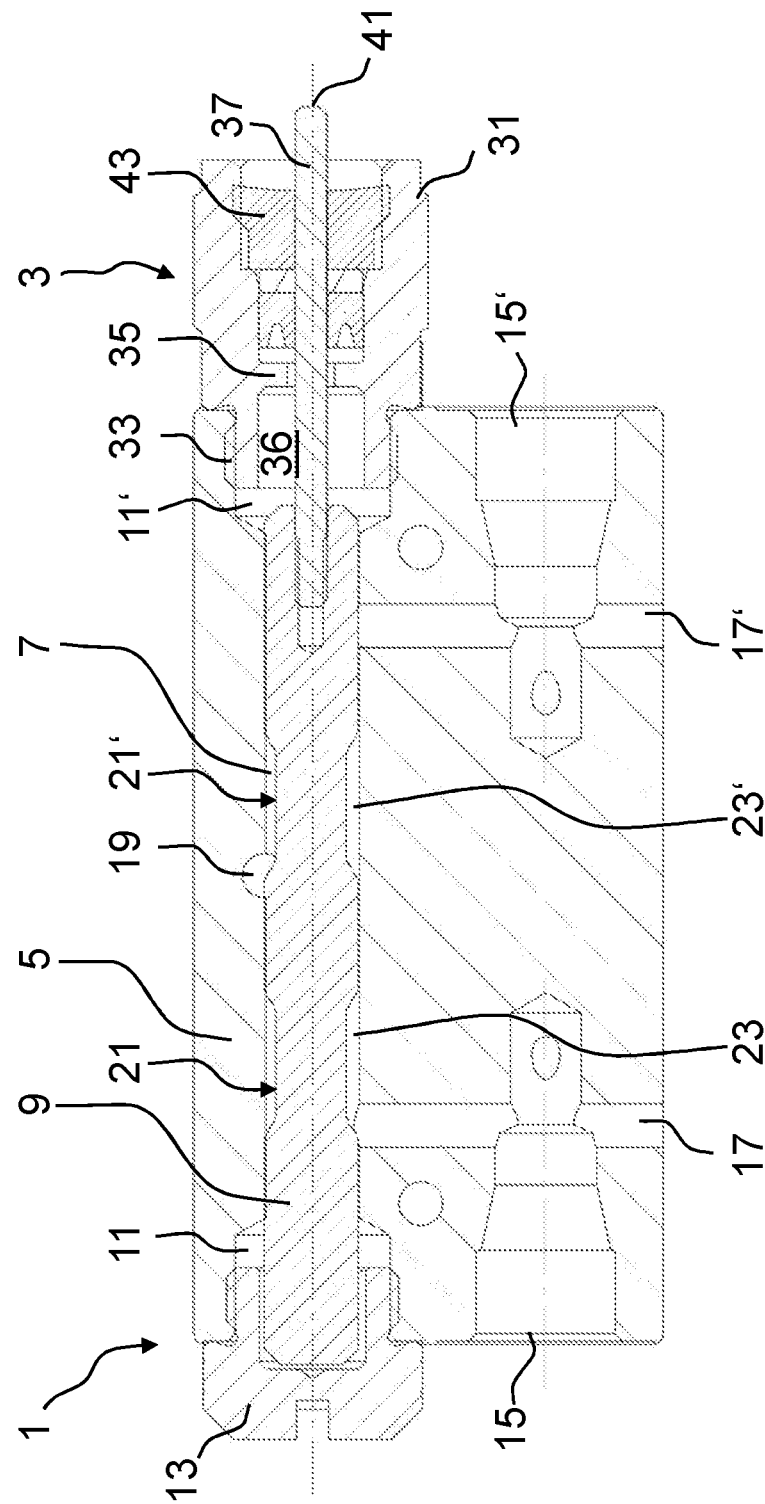
FIG. 1 is a detection device according to the prior art.

Due to the retaining force of the retaining unit 143, even in the case of shocks and vibrations the ring magnet 137 remains securely in the position shown, with the result that a false negative result in the visual inspection is precluded. This is a decisive advantage compared to the known indicator unit depicted in FIG. 1.

After completion of the visual inspection, the maintenance technician can overcome the retaining pressure of the retaining unit 143 by simple leftward pressure on the cap 151 and push the ring magnet 137 back onto the left end of the raceway so that the next lubricating cycle can be indicated again by the detector 101. After releasing, the cap 151 is moved back into its initial position by the spring 155 not shown in FIG. 6.

A detector 101 according to the disclosure can be adapted in constructive details to various types and embodiments of lubricant distributors in a simple manner and also installed on already existing systems. Since the pin 119 of the detector 101 need not be connected permanently to the piston in order that a reliable detection of the proper functioning of the lubricant distributor is insured, the metering piston also need not have any special properties, such as, for example, a receiving thread as in FIG. 1. A detector according to the disclosure can thus be retrofitted in a simple manner to existing lubricant distributors. In terms of construction it is embodied relatively simply and can be reliably operated by maintenance technicians. The cap 151 also provides reliable protection against contamination. The entire detector 101 does not require a dynamic seal since no moving part penetrates the housing. It is precluded in this respect that a leakage of lubricant results.

In FIGS. 7 to 10 various further embodiments of the disclosure are shown, wherein in particular the embodiment of the retaining element differs. The basic working principle of the disclosure is realized in all embodiments.

Figure 7:
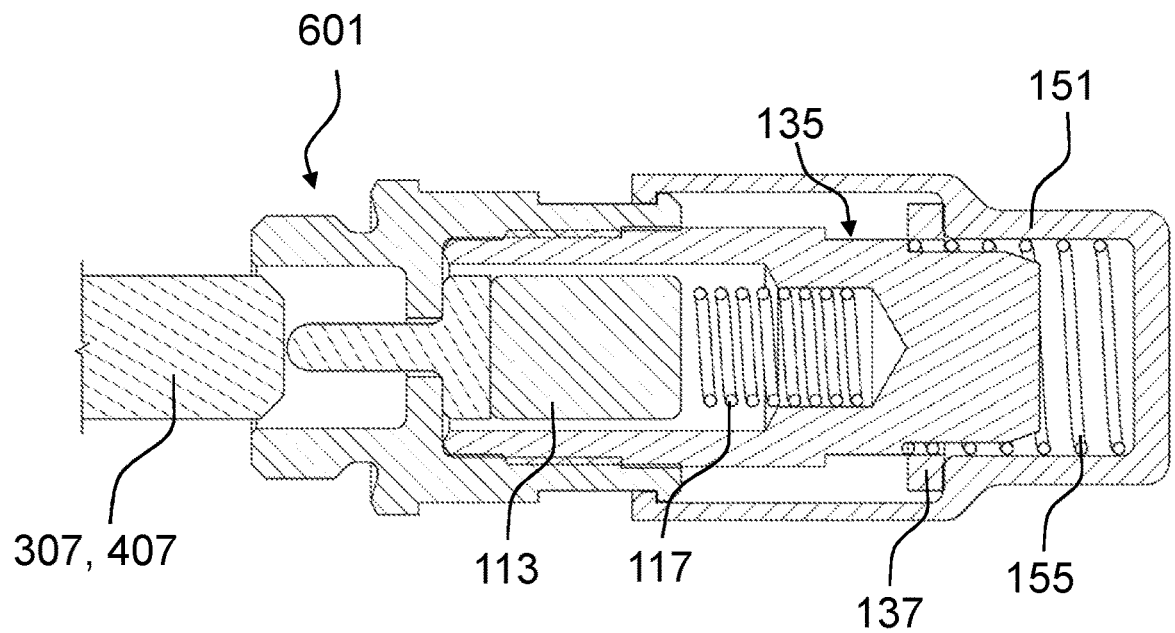
FIGS. 7 to 10 show various embodiments of a retaining element.

In FIG. 7 a detector 601 is depicted that is constructed in analogous manner to the detector 101 of FIGS. 5 and 6. However, no separate retaining unit 143 is provided here. Rather, the spring 155 is embodied from a magnetizable material, and dimensioned and disposed such that the magnet ring 137 can be pushed over it. In an analogous manner to the retaining unit 143 of the detector 101 a retaining force thereby arises such that the magnet ring 137 is not moved back with a return movement of the permanent magnet 113. This embodiment is particularly simply embodied due to the double function of the spring 155.

Figure 8:
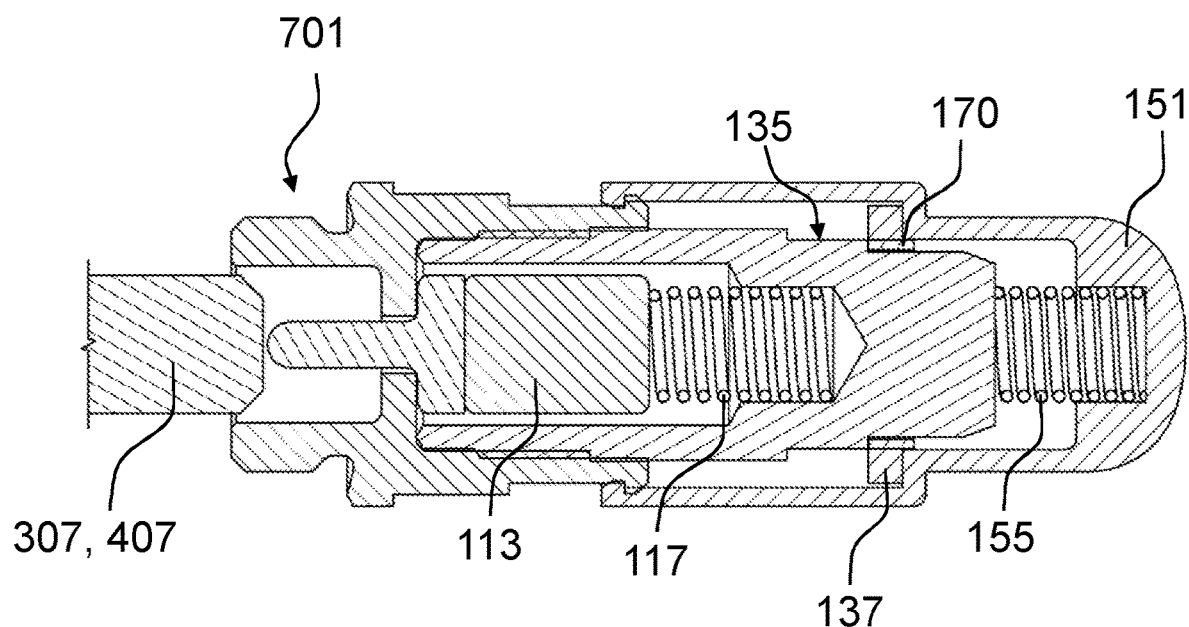

In FIG. 8 a detector 701 is depicted that is in turn constructed in an analogous manner to the detector 101 of FIGS. 5 and 6. Here the retaining element is embodied as a thin ring 170, over which the magnet ring 137 is pushable. The ring 170 consists, for example, of a thin metal foil made from magnetizable material and fulfills the same function as the retaining element 143. In addition, the ring 170 at least partially includes a surface that is embodied in a signal color, e.g., green, that differs from the coloring of the rest of the detector. Thus on the one hand the maintenance technician can determine at a glance that the ring 170 is present when it is not covered by the magnet ring 137. On the other hand, after actuation of the cap 151, it can be simply determined that the magnet ring 137 has been brought back into its initial position since the ring 10 is then visible again. This is also transferable to the other exemplary embodiments wherein a corresponding region of the housing is then embodied in the signal color.

Figure 9:
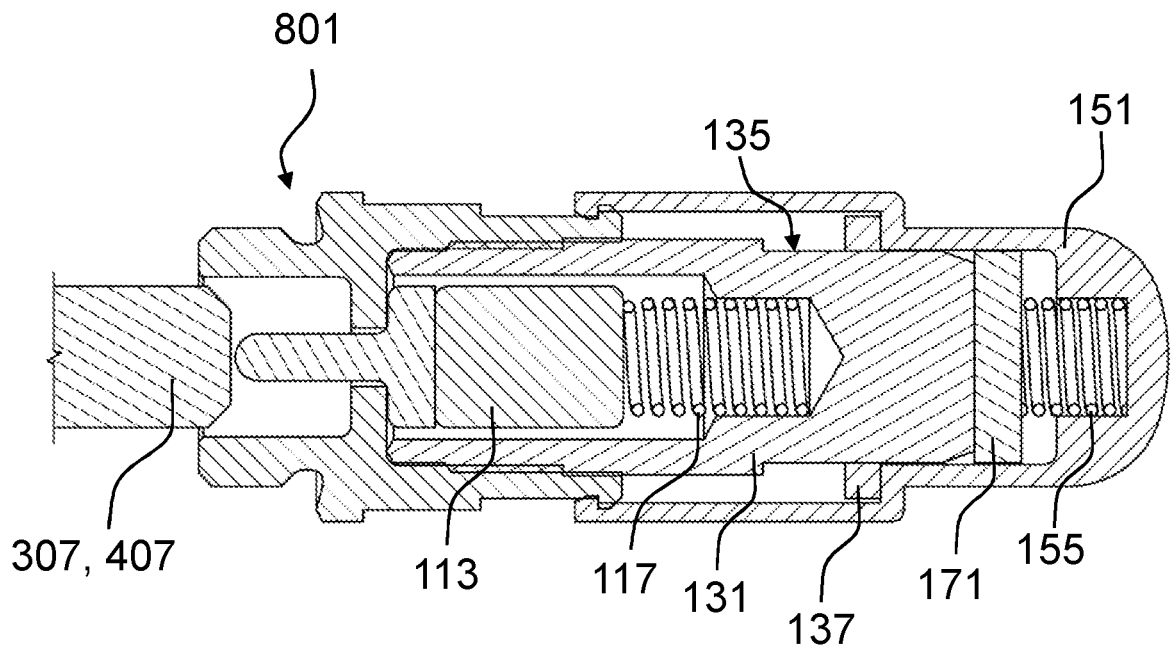

In FIG. 9 a detector 801 is depicted that is in turn embodied analogously to detector 101 of FIGS. 5 and 6. Here the retaining unit 171 is embodied disk-shaped and disposed between the spring 155 and the housing part 131.

Figure 10:
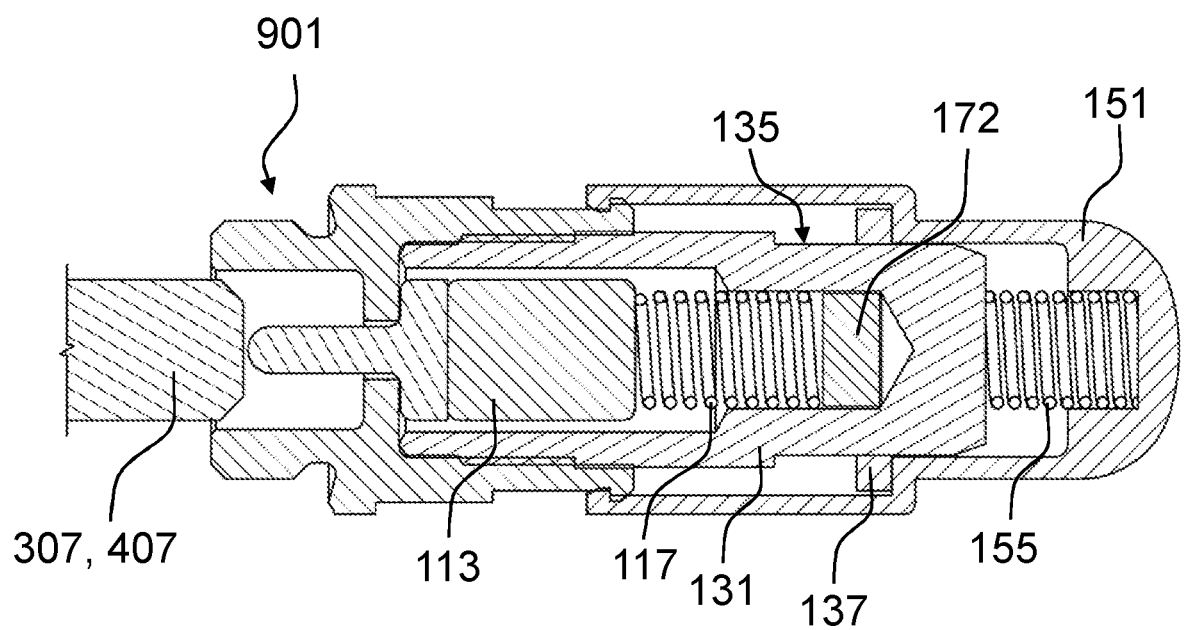

In FIG. 10 a detector 901 is depicted that is in turn constructed analogously to the detector 101 of FIGS. 5 and 6. Here the retaining unit 172 is disposed between the spring 117 and the housing part 131.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved lubrication distributors and detection devices.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Lubricant distributor
3 Indicator unit
5 Housing
7 Cylinder bore
9 Metering piston
11, 11' Bore
13 Closure piece
15, 15' Lubricant outlet
17, 17' Lubricant canal
19 Lubricant inlet
21, 21' Constriction
23, 23' Cavity
31 Housing
33 Internal thread
35 Separating wall
36 Hollow space
37 Pin
39 Thread
41 End
43 Seal unit
101, 601, 701, 801, 901 Detector
103, 131 Housing part
105 Separating wall
107, 109, 153 Hollow space
111 Transfer unit
113 Permanent magnet
115 Pin unit 117, 155 Spring
119 Pin
133 Screw connection
135 Raceway
137 Magnet ring
139 Seat surface
141 Step
143, 171, 172 Retaining unit
145, 159, 161 Section
151 Cap
157 End-inner side
163 Shoulder
170 Ring
301, 401 Lubricant distributor
303, 403 Housing
305, 405 Bore
307, 407 Metering piston

The invention claimed is:

1. A device for detecting a movement of a piston of a lubricant distributor, the device comprising:
    a movable actuator including a first magnet element biased toward an initial actuator position by a first spring, and
    a movable indicator including a second magnet element, the second magnet element comprising an annular permanent magnet,
    wherein the actuator is configured to be moved from the initial actuator position to an end actuator position by a movement of the piston,
    wherein the actuator and the indicator are configured and disposed such that a repulsive magnetic force prevails between them such that the indicator is moved from an initial indicator position to an end indicator position by the movement of the actuator from the initial actuator position toward the end actuator position, and
    wherein the first spring extends through the annular permanent magnet.

2. The device according to claim 1, further including a retainer configured to exert a retaining force on the indicator when the indicator is located in the end indictor position.

3. The device according to claim 2, wherein the retainer is at least partially comprised of a magnetizable material.

4. The device according to claim 1, wherein the actuator includes a pin pointing toward the piston.

5. The device according to claim 1, wherein
    the first magnetic element is a cylindrical permanent magnet,
    the second magnetic element is axially spaced from the actuator,
    the actuator and the indicator are disposed such that when the actuator is disposed in the initial actuator position and the indicator is disposed in the initial indicator position, a magnetic force between the actuator and the indicator is insufficient to move the indicator, and
    the actuator and the indicator are oriented such that a movement of the actuator from the actuator initial position toward the actuator end position applies a repulsive magnetic force against the indicator large enough to displace the indicator.

6. The device according to claim 1, further including a movable cap using which the indicator is moveable from the end indicator position to the initial indicator position.

7. The device according to claim 1, further including a force element, using which the actuator is movable from the end actuator position to the initial actuator position.

8. The device according to claim 7, wherein the force element is a spring element.

9. A lubricant distributor including a housing block and at least one piston guided in a piston bore and at least one device according to claim 1.

10. The device according to claim 1,
    including a first housing having an internal bore and an outer guide surface, the movable actuator being slidable mounted in the internal bore of the first housing,
    a second housing having an internal bore and an outer guide surface, the outer guide surface of the first housing extending into the internal bore of the second housing and the movable indicator being slidably mounted on the outer guide surface of the second housing.

11. The device according to claim 10,
    a cap having an internal shoulder slidably mounted on the guide surface of the second housing and configured to slide the indicator from the end indicator position to the initial indicator position by sliding along the guide surface of the second housing,
    wherein the first magnet element is mounted on a base having a pin projecting toward the piston, and
    wherein the cap is biased away from the first housing by a second spring.

12. A device for detecting a movement of a piston of a lubricant distributor, the device comprising:
    a movable actuator including a cylindrical permanent magnet,
    a movable indicator including an annular permanent magnet axially spaced from the movable actuator, and
    a movable cap that covers the indicator and is transparent in a region of the indicator,
    wherein the actuator is configured to be moved axially from an initial actuator position to an end actuator position by a movement of the piston,
    wherein the actuator and the indicator are configured and disposed such that a magnetic force prevails between them such that the indicator is moved axially from an initial indicator position to an end indicator position by the movement of the actuator from the initial actuator position toward the end actuator position, and
    wherein the movable cap includes an internal shoulder configured to contact the indicator and move the indicator from the end indicator position to the initial indicator position when the movable cap moves axially toward the movable actuator.

13. A device for detecting a movement of a piston of a lubricant distributor, the device comprising:
    a first housing having an internal bore and an outer guide surface,
    a second housing having an internal bore and an outer guide surface, the outer guide surface of the first housing extending into the internal bore of the second housing,
    an actuator comprising a first magnet element slidably mounted in the internal bore of the first housing, and
    a movable indicator including a second magnet element slidably mounted on the guide surface of the second housing,
    wherein the actuator is configured to be moved from an initial actuator position to an end actuator position by a movement of the piston from a first position to a second position, and
    wherein the actuator and the indicator are configured and disposed such that a repulsive magnetic force prevails between them such that the indicator is moved from an initial indicator position to an end indicator position by the movement of the actuator from the initial actuator position toward the end actuator position.

14. The device according to claim 13, including a spring in the second housing biasing the actuator toward the initial actuator position.

15. The device according to claim 14, wherein the first magnet element is mounted on a base having a pin projecting toward the piston.

16. The device according to claim 14 including a cap having an internal shoulder slidably mounted on the guide surface of the second housing and configured to slide the indicator from the end indicator position to the initial indicator position by sliding along the guide surface of the second housing.

17. The device according to claim 16, wherein the cap is spring biased away from the first housing.

* * * * *